(12) United States Patent
Khdary et al.

(10) Patent No.: US 9,243,338 B2
(45) Date of Patent: Jan. 26, 2016

(54) METHOD FOR SYNTHESIZING PLATINUM NANOPARTICLES INCORPORATED ON SILICA

(71) Applicant: King Abdul Aziz City for Science and Technology (KACST), Riyadh (SA)

(72) Inventors: Nezar Hassan Mohamed Khdary, Riyadh (SA); Mohamed Ali Ghanem, Riyadh (SA)

(73) Assignee: King Abdulaziz City for Science and Technology (KACST), Riyadh (SA)

( * ) Notice: Subject to any disclaimer, the term of this patent is extended or adjusted under 35 U.S.C. 154(b) by 64 days.

(21) Appl. No.: 14/151,567

(22) Filed: Jan. 9, 2014

(65) Prior Publication Data
US 2015/0191835 A1    Jul. 9, 2015

(51) Int. Cl.
*B01J 21/00* (2006.01)
*C25B 11/04* (2006.01)

(52) U.S. Cl.
CPC ......... *C25B 11/0473* (2013.01); *C25B 11/0421* (2013.01)

(58) Field of Classification Search
CPC ............ B01J 21/08; B01J 23/42; B01J 37/02; B01J 37/0203; B01J 37/08; B01J 37/16
USPC ......................................................... 502/262
See application file for complete search history.

(56) References Cited

U.S. PATENT DOCUMENTS

| | | | | |
|---|---|---|---|---|
| 2,623,860 A * | 12/1952 | Haensel | ......................... | 502/230 |
| 2,777,805 A * | 1/1957 | Lefrancois et al. | ........... | 208/139 |
| 8,859,454 B2 * | 10/2014 | Bentele et al. | ................ | 502/262 |
| 2012/0020843 A1 * | 1/2012 | Bentele et al. | ................ | 422/169 |
| 2014/0050640 A1 * | 2/2014 | Ergang et al. | ................. | 423/210 |

* cited by examiner

*Primary Examiner* — Cam N. Nguyen
(74) *Attorney, Agent, or Firm* — Timberline Patent Law Group PLLC

(57) ABSTRACT

The invention provides a method for synthesizing platinum nanoparticles incorporated on silica. The method includes immobilizing dithiocarbamate functional group on a surface of the silica to form dithiocarbamate-silica. The method includes treating the dithiocarbamate-silica with platinic acid to form Platinum (II) [Pt (II)] dithiocarbamate complex on the silica and thereafter, reducing the Pt (II) dithiocarbamate complex.

17 Claims, 5 Drawing Sheets

METHOD FOR SYNTHESIZING PLATINUM NANOPARTICLES INCORPORATED ON SILICA

FIELD OF THE INVENTION

The invention generally relates platinum nanoparticles. More specifically, the invention relates to a method of synthesizing platinum nanoparticles incorporated on silica.

BACKGROUND OF THE INVENTION

Platinum metal and other noble metals such as, but not limited to, palladium or gold is used as an electro-catalyst to speed up an electrochemical process of interest. Generally, the platinum or other noble metals used in electro-catalytic applications are required to be in finely dispersed form as catalytic activities are critically tied to particle size of the catalyst. The platinum metal and other noble metals are expensive and therefore, there is a necessity to optimize the amount of such metals when used in the electro-catalytic applications. To obtain efficient metal nanoparticle catalyst, there is a necessity to have a highest possible degree of metal dispersion and smaller particle size particularly for expensive noble metals such as platinum. Various conventional methods such as, but not limited to, a wet impregnation, an ion exchanging and a chemical surface modification are used to prepare metal nanoparticle catalysts. The particle size of the metal nanoparticle catalysts prepared using the conventional methods may not satisfy the requirement of high degree of metal dispersion and smaller particle size.

Thus, there is a need to develop an improved method for synthesizing platinum nanoparticles.

BRIEF DESCRIPTION OF THE FIGURE

The accompanying figure together with the detailed description below forms part of the specification and serves to further illustrate various embodiments and to explain various principles and advantages all in accordance with the invention.

DETAILED DESCRIPTION OF THE INVENTION

Before describing in detail embodiments that are in accordance with the invention, it should be observed that the embodiments reside primarily for platinum nanoparticles incorporated on silica and in method steps related to synthesizing the platinum nanoparticles incorporated on the silica.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article or composition that comprises a list of elements does not include only those elements but may include other elements not expressly listed or inherent to such process, method, article or composition. An element proceeded by "comprises . . . a" does not, without more constraints, preclude the existence of additional identical elements in the process, method, article or composition that comprises the element.

Generally speaking, pursuant to various embodiments, the invention provides platinum nanoparticles incorporated on silica and a method for synthesizing the platinum nanoparticles incorporated on the silica. The method includes immobilizing dithiocarbamate functional group on a surface of the silica to form dithiocarbamate-silica. Further, the method includes treating the dithiocarbamate-silica with platinic acid to form Platinum (II) [Pt (II)] dithiocarbamate complex on the silica and reducing the Pt (II) dithiocarbamate complex.

Figure 1:
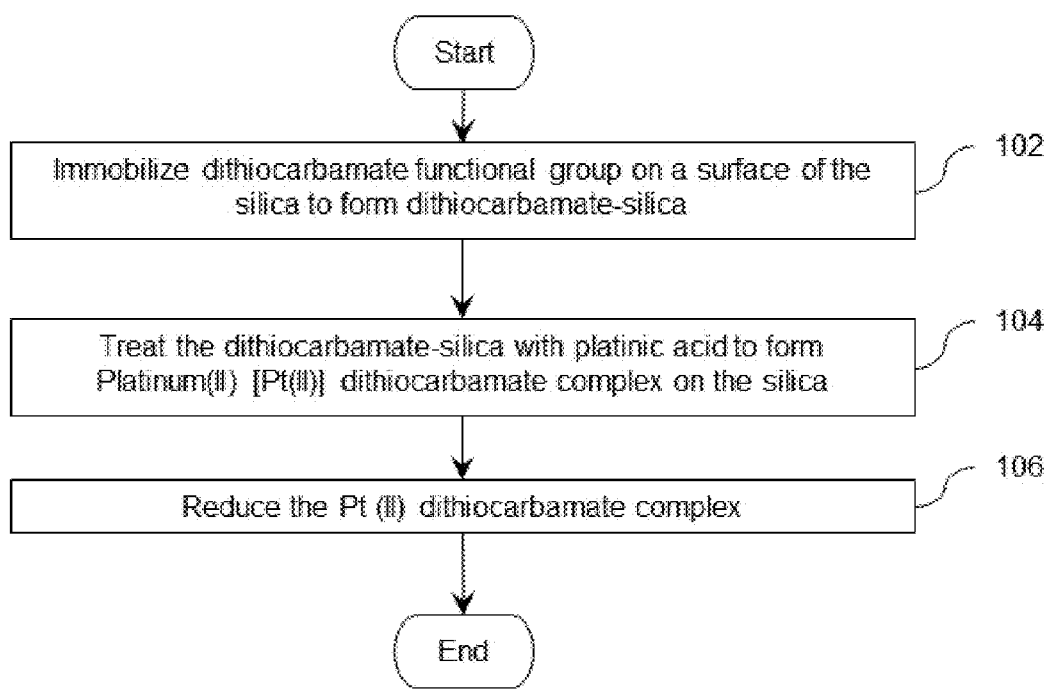
FIG. 1 illustrates a flow diagram of a method for synthesizing platinum nanoparticles incorporated on silica in accordance with an embodiment of the invention.

FIG. 1 illustrates a flow diagram of a method for synthesizing platinum nanoparticles incorporated on silica in accordance with an embodiment of the invention.

At step 102, dithiocarbamate functional group is immobilized on a surface of the silica to form dithiocarbamate-silica. In an embodiment, the dithiocarbamate functional group is immobilized on the surface of the silica using coupling agents. The coupling agents comprises (N[3-(trimethoxysilyl) propyl] ethylenediamine to form amino-silica and carbon disulfide ($CS_2$) in at least one organic solvent to convert amino-silica to dithiocarbamate-silica. In an embodiment, a method of immobilizing the dithiocarbamate functional group on a surface of the silica to form dithiocarbamate-silica includes heating the silica with toluene at a temperature of 90 degree Celsius (° C.). After heating the silica with toluene, silica is modified with N-[3-(trimethoxysilyl) propyl] ethylendiamine under nitrogen atmosphere to form silica-diamine. In an embodiment, the silica is modified with N-[3-(trimethoxysilyl) propyl] ethylendiamine under nitrogen atmosphere for a period of about 6 hours to about 7 hours to form silica-diamine. Thereafter, the silica-diamine is treated with the carbon disulfide in the at least one organic solvent under nitrogen atmosphere. In an embodiment, the silica-diamine is treated with carbon disulfide under nitrogen atmosphere at temperature of about 20° C. to about 27° C. for a period of about 30 minutes to about 2 hours. The organic solvents can be isopropanol or any other organic solvent which is apparent to the person skilled in the art. Further, the silica-diamine can be pre-treated with deionized water, a sodium hydroxide (NaOH) solution and isopropanol before treating with carbon disulfide. In an embodiment, the silica-diamine is pretreated with the deionized water, a sodium hydroxide solution and isopropanol comprises sonication for a period of about 5 minutes to about 10 minutes. In an embodiment, the concentration of the sodium hydroxide is 0.1 Molar (M).

Thereafter, at step 104, the dithiocarbamate-silica is treated with platinic acid to form Platinum (II) [Pt (II)] dithiocarbamate complex on the silica. In an embodiment, the treatment of dithiocarbamate-silica with the platinic acid includes shaking dithiocarbamate-silica with the platinic acid for a period of about 10 minutes to about 1 hour. The platinic acid is selected from one or more of halogenated platinic acid, platinum ions and hexahydroxy platinic acid. The halogenated platinic acid can be one of chloroplatinic acid ($H_2PtCl_6$), bromoplatinic acid and iodoplatinic acid. In an embodiment, concentration of the platinic acid is 0.1 M.

Finally, at step 106, the Pt (II) dithiocarbamate complex is reduced using one or more reducing agents. The one or more reducing agents can be selected from a group which includes sodium borohydride ($NaBH_4$) and hydrazine. In an embodiment, the Pt (II) dithiocarbamate complex is reduced using sodium borohydride, wherein the concentration of sodium borohydride is 2.0 M.

The method of synthesizing platinum nanoparticles incorporated on silica is also applicable for one or more reducible metal ions emplaced on a support with linker corresponding to the one or more reducible metal ions.

Figure 2:
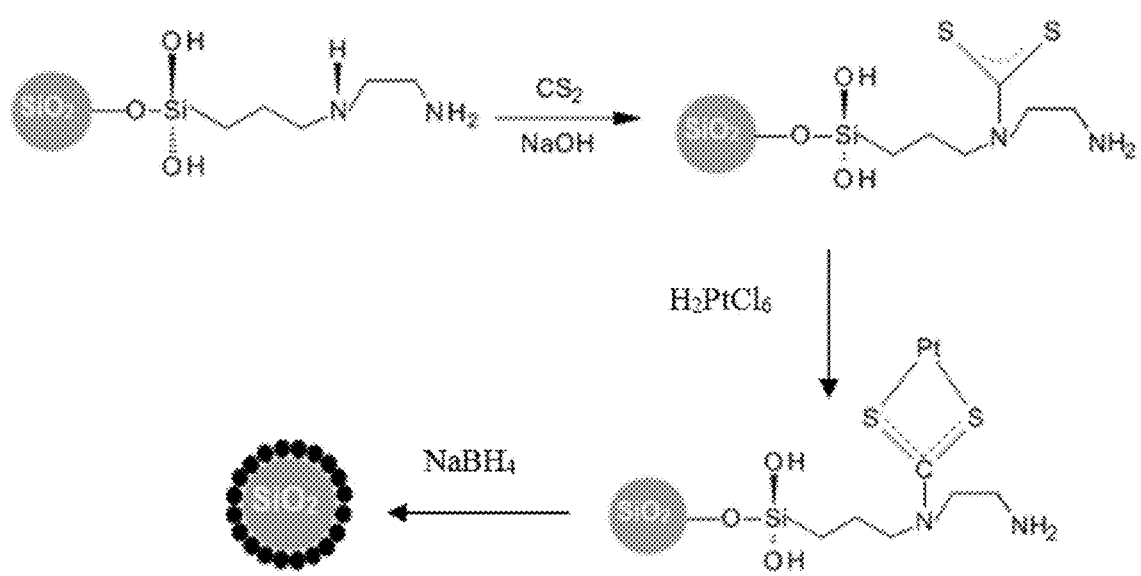
FIG. 2 illustrates a complete reaction for synthesis of platinum nanoparticles incorporated on silica in accordance with an embodiment of the invention.

FIG. 2 illustrates a complete reaction for synthesis of platinum nanoparticles incorporated on silica in accordance with an embodiment of the invention. As illustrated in FIG. 2, firstly mono-dithiocarbamate ligand is immobilized on a silica support using N-[3-(trimethoxysilyl) propyl] ethylenediamine and followed by treatment with $CS_2$. Thereafter, the mono-dithiocarbamate modified silica is reacted with $H_2PtCl_6$ to produce Pt (II) dithiocarbamate complex modified silica support. Finally, the Pt (II) dithiocarbamate complex is converted to Pt nanoparticles which are settled on silica surface by chemical reduction using $NaBH_4$ as a reducing agent.

WORKING EXAMPLE

Synthesis of Platinum Nanoparticles Incorporated on Silica Gel

The silica gel is firstly modified with N-[3-(trimethoxysilyl) propyl] ethylenediamine by transferring 150 milliliter (ml) of dry toluene into a 250 ml round-bottom flask fitted with a reflux condenser. 5.0 grams (g) of silica gel is dispersed in the 150 ml toluene by agitation and heated to 90° C. After the temperature is stabilized, 2.0 ml of N-[3-(trimethoxysilyl) propyl] ethylenediamine is slowly added to the 250 ml round-bottom flask and the reaction is carried out under nitrogen atmosphere for 6 hours. Thereafter, the temperature is brought down to room temperature. The diamine-silica is formed in the 250 ml round-bottom flask which is separated by centrifuging. The diamine-silica is rinsed thoroughly with toluene and dried overnight under vacuum. For preparing mono-dithiocarbamate-silica, 100 ml of deionized water and 2 ml 0.1 M NaOH solution is added into a 500 ml three-necked round bottomed flask. 5 g of the silica-diamine is added to the 500 ml three-necked round bottomed flask followed by 8 ml of isopropanol. Sonication is carried out for 10 minutes and thereafter, 8 ml of carbon disulfide ($CS_2$) is added to the 500 ml three-necked round bottomed flask. The reaction is allowed to proceed under nitrogen atmosphere at 20° C. for 1 hour. The product is centrifuged at 3000 revolution per minute (rpm) and a white precipitate is formed. The white precipitate is rinsed four times with isopropanol until the $CS_2$ is completely removed. The product is dried in a vacuum desiccator and stored under nitrogen atmosphere at 4° C. prior to use.

The synthesis of Pt (II) dithiocarbamate complex (Pt-DTC-S) is carried out by transferring 500 milligrams (mg) of mono-dithiocarbamate-silica into a first 40 ml glass vial and adding 5 ml of 1.0 M H2PtCl2 solution to the 40 ml glass vial. The vial containing the mono-dithiocarbamate-silica and the 1.0 M H2PtCl2 solution is shaken for 1 hour to form the Pt (II) dithiocarbamate complex. The excess of platinum ions solution is removed by washing Pt(II) dithiocarbamate complex product with deionized water several times until no absorption is observed for the effluent at 300 nanometer (nm). The color of mono-dithiocarbamate-silica is changed from white to yellow after the Pt(II) dithiocarbamate complex is formed.

Finally, the platinum nanoparticles incorporated on silica gel (Pt—NP—S) is prepared by transferring 150 mg of Pt-DTC-S to a second 40 ml glass vial, wherein the second 40 ml glass vial includes an inlet/an outlet needle. 5 ml of freshly prepared 2.0 M $NaBH_4$ is slowly added to the second 40 ml glass vial and left for 30 minutes until a metal dark color is observed. The product is rinsed several times with ultra-pure deionized water and kept under nitrogen to dry in desiccator.

Figure 3:
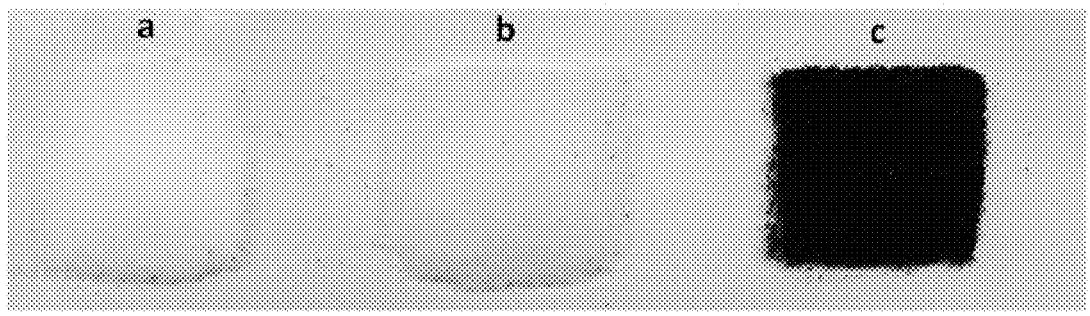
FIG. 3 shows optical images for unmodified silica (a), Pt (II) dithiocarbamate complex (b) and platinum nanoparticles incorporated on silica gel (c).

FIG. 3 shows optical images for unmodified silica (a), Pt (II) dithiocarbamate complex (b) and platinum nanoparticles incorporated on silica gel (c). For comparison, a control experiment using unmodified silica is performed at the same condition and is shown in FIG. 3(*a*). Clearly, after treatment of mono-dithiocarbamate modified silica with $H_2PtCl_6$ solution, the color changes from white to yellow. The coloration of silica particles is a qualitative indication of formation of Pt (II) complex with dithiocarbamate functional groups. The Pt (II) complex is stabilized when adsorbed on solid surface and also may have cross linkage and internal polymerization. Finally, the Pt (II) dithiocarbamate complex is chemically reduced in aqueous solution using sodium borohydride as a reducing agent to produce the platinum nanoparticles incorporated on the silica support. The optical image in FIG. 3*c* shows that the color of the Pt (II) dithiocarbamate complex changes into black after reduction with NaBH4 which quantitatively indicates formation of Pt nanoparticles.

Figure 4:
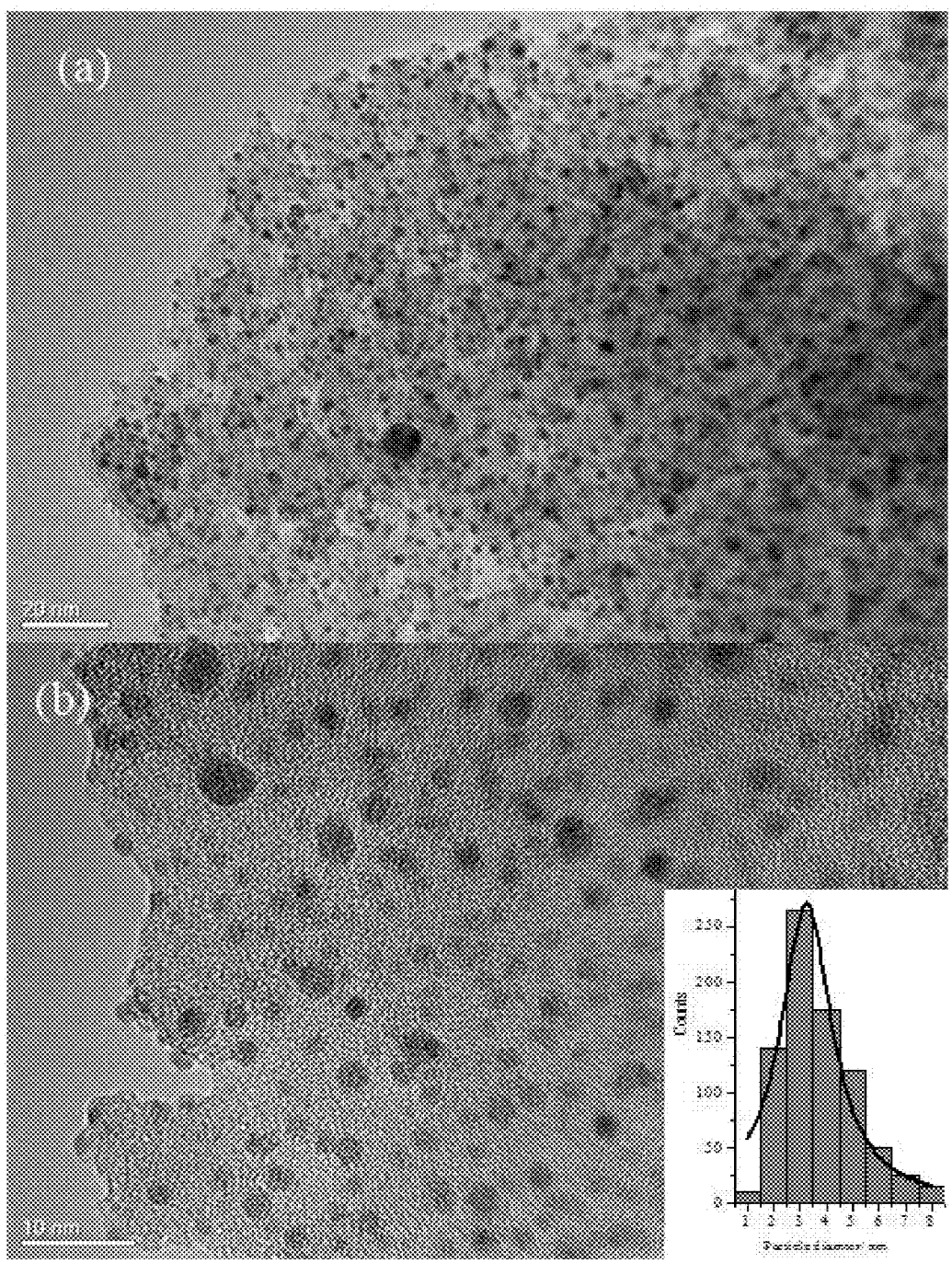
FIG. 4 illustrates Transmission Electron Microscopy (TEM) micrographs for Pt nanoparticles supported on silica gel with lower (a) and higher (b) magnification.

Various embodiments of the invention provide platinum nanoparticles incorporated on silica with significantly improved properties. FIG. 4 illustrates Transmission Electron Microscopy (TEM) micrographs for Pt nanoparticles supported on silica gel with lower (a) and higher (b) magnification. The inset shows a particle size distribution histogram. The platinum nanoparticles exhibit a narrow size distribution in a range of 2-5 nm as shown in the inset histogram in FIG. 4 (*b*). The platinum dispersion measured from carbon monoxide (CO) chemical adsorption isotherm is equals 3.28 weight percent (Wt %) with metallic surface area of 8.1 meter square per gram of platinum (m2/gPt). The Pt nanoparticles loading can be estimated at 0.168 mill moles per gram (mmol/g) of silica which is very consistent with the value of 0.178 mmol/g of sulfur loading which indicates that Pt ions bonded to thiocarbamate in ratio of 1:1 on the silica surface. The Pt nanoparticles' diameter obtained using the invention is smaller than the diameter of 10 to 35 nm. The presence of dithiocarbamate functional groups clearly provides well dispersed platinum nanoparticles and prevents the aggregation of nanoparticles throughout the silica support.

Figure 5:
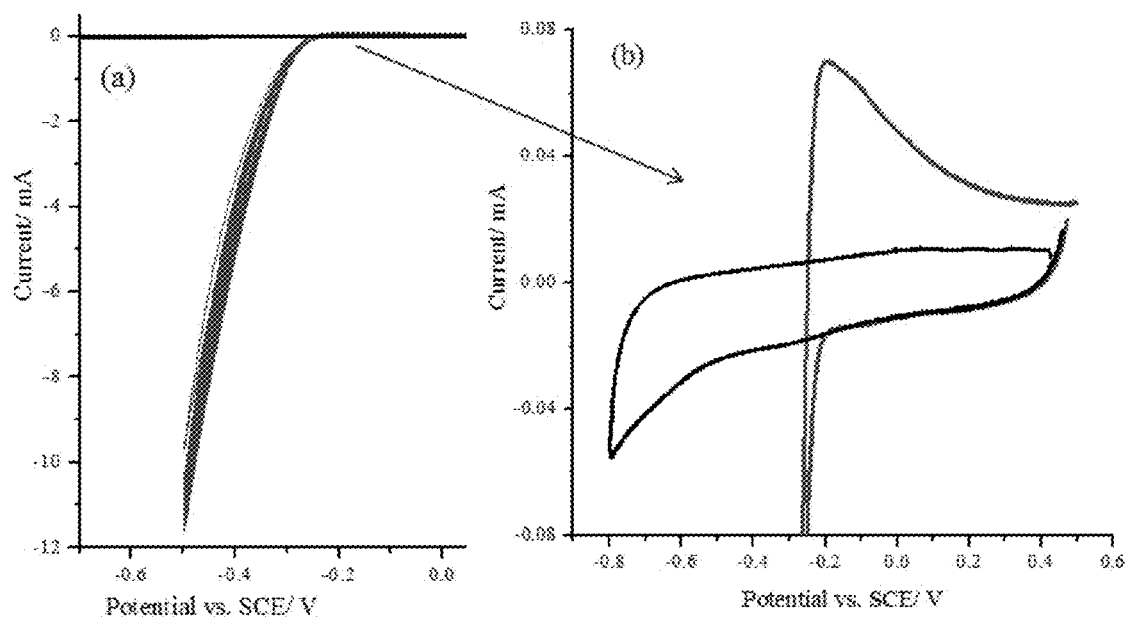
FIG. 5 illustrates a cyclic voltammetry at 50 millivolts per second (mV s−1) for Pt nanoparticles incorporated silica (red line) and glassy carbon bar electrode in 2.0 M H2SO4 (black line).

Generally, platinum metal is used as an electro-catalyst to speed up an electrochemical process such as electro-catalytic applications. Consider a scenario where platinum nanoparticles incorporated on silica (Pt—NP—S) synthesized using the invention is used in electro-catalytic activity for hydrogen evolution reaction. The preliminary catalytic activity of Pt—NP—S as a catalyst toward Hydrogen Evolution Reaction (HER) is studied by cyclic voltammetry. FIG. 5 illustrates a cyclic voltammetry at 50 millivolts per second (mV s−1) for Pt nanoparticles incorporated silica (red line) and glassy carbon bar electrode in 2.0 M H2SO4 (black line). Prior to the electrochemical characterization, the catalyst is activated at 200° C. and degased for 2 hour. Thereafter, 1.0 mg of Pt nanoparticles supported silica is suspended in 1.0 ml isopropanol containing 1.0 Wt % nafion. 15 microliter (μl) of the catalyst suspension is loaded on 3 millimeter (mm) of Glassy Carbon (GC) disk electrode and dried out in air. FIG.

5(a) shows multi-cyclic voltammetry curves at 50 mV s−1 of the Pt nanoparticles silica catalyst (total Pt loading about 0.5 µg) in 2.0 M sulfuric acid ($H_2SO_4$). The HER onset potential occurs at about −0.215 Volt (V) versus Saturated Calomel Electrode (SCE) as indicated by an abrupt increase in the cathodic current (red line FIG. 5a). The performance of the Pt—NP—S silica catalyst is stable for more than 100 cycles and hydrogen evolution current slightly increases with successive cycling due to the surface cleaning with hydrogen evolution. In potential region more negative than −0.3 V versus SCE, the catalyst shows high activity for hydrogen evolution with current density of $1.17 \times 10^2$ ampere per gram of platinum (A/gPt). The Electrochemical Active Area (EAA) for the Pt-S calculated from the charge of hydrogen desorption region [as shown in FIG. 5 (b)] reaches about 7.8 m2/gPt which is consistent with the metallic surface area of 8.1 m2/gPt measured from CO chemical adsorption analysis.

Various embodiments of the invention provide an improved method to synthesize platinum nanoparticles. Using the present invention, an optimal amount of platinum nanoparticles can be synthesized. The platinum nanoparticles incorporated in silica can be used in various electro-catalytic applications. The platinum nanoparticles incorporated in silica can be used as a catalyst due a highest possible degree of platinum dispersion and smaller particle size.

Those skilled in the art will realize that the above recognized advantages and other advantages described herein are merely exemplary and are not meant to be a complete rendering of all of the advantages of the various embodiments of the invention.

In the foregoing specification, specific embodiments of the invention have been described. However, one of ordinary skill in the art appreciates that various modifications and changes can be made without departing from the scope of the invention as set forth in the claims below. Accordingly, the specification is to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for synthesizing platinum nanoparticles incorporated on silica, the method comprising:
   immobilizing dithiocarbamate functional group on a surface of the silica to form dithiocarbamate-silica;
   treating the dithiocarbamate-silica with platinic acid to form Platinum (II) [Pt (II)] dithiocarbamate complex on the silica; and
   reducing the Pt (II) dithiocarbamate complex.

2. The method of claim 1, wherein the silica is selected from the group consisting of silica nanoparticles, mesoporous silica and silica gel.

3. The method of claim 1, wherein the dithiocarbamate functional group is immobilized on the surface of the silica using coupling agents, wherein the coupling agents comprises (N-[3-(trimethoxysilyl)propyl]ethylenediamine to form amino-silica and carbon disulfide in at least one organic solvent to convert amino-silica to dithiocarbamate-silica.

4. The method of claim 3, wherein the at least one organic solvent is isopropanol.

5. The method of claim 3, wherein the immobilization of the dithiocarbamate functional group on the surface of the silica to form dithiocarbamate-silica comprises;
   heating the silica with toluene at a temperature of 90 degree Celsius (° C.);
   modifying silica with N-[3-(trimethoxysilyl)propyl]ethylenediamine under nitrogen atmosphere to form silica-diamine; and
   treating the silica-diamine with the carbon disulfide in the at least one organic solvent under nitrogen atmosphere.

6. The method of claim 5, further comprising pre-treating the silica-diamine with deionized water, a sodium hydroxide solution and isopropanol before treating with carbon disulfide.

7. The method of claim 6, wherein the pre-treatment of the silica-diamine with the deionized water, a sodium hydroxide solution and isopropanol comprises sonication for a period of about 5 minutes to about 10 minutes.

8. The method of claim 6, wherein concentration of the sodium hydroxide solution is 0.1 Molar (M).

9. The method of claim 5, wherein the silica is modified with N-[3-(trimethoxysilyl)propyl]ethylendiamine under nitrogen atmosphere for a period of about 6 hours to about 7 hours.

10. The method of claim 5, wherein the silica-diamine is treated with carbon disulfide under nitrogen atmosphere at temperature of about 20° C. to about 27° C. for a period of about 30 minutes to about 2 hours.

11. The method of claim 1, wherein the treatment of the dithiocarbamate-silica with the platinic acid comprises shaking dithiocarbamate-silica with the platinic acid for a period of about 10 minutes to about 1 hour.

12. The method of claim 1, wherein the platinic acid is selected from the group consisting of halogenated platinic acid, platinum ions and hexahydroxy platinic acid.

13. The method of claim 12, wherein the halogenated platinic acid comprises chloroplatinic acid, bromoplatinic acid and iodoplatinic acid.

14. The method of claim 1, wherein concentration of the platinic acid is 0.1 M.

15. The method of claim 1, wherein the Pt (II) dithiocarbamate complex is reduced using at least one reducing agent.

16. The method of claim 15, wherein the at least one reducing agent is selected from the group consisting of sodium borohydride and hydrazine.

17. The method of claim 16, wherein a concentration of the sodium borohydride is 2.0 M.

* * * * *